No. 858,808. PATENTED JULY 2, 1907.
E. GROTZ & J. W. KENNEDY.
ATTACHMENT FOR MILLING MACHINES.
APPLICATION FILED AUG. 28, 1905.
2 SHEETS—SHEET 1.
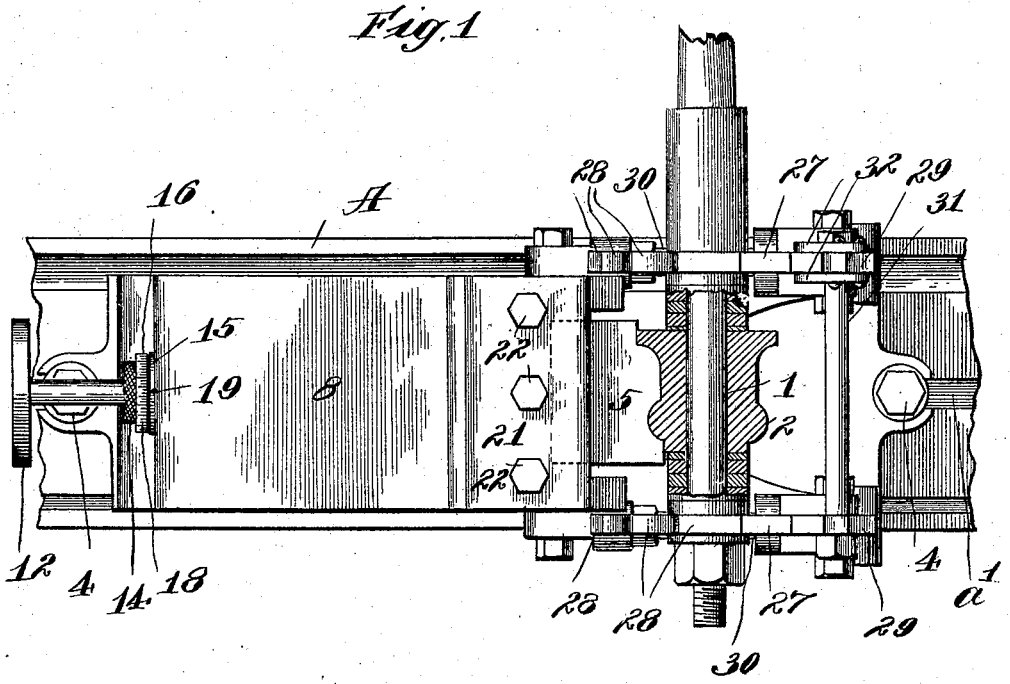
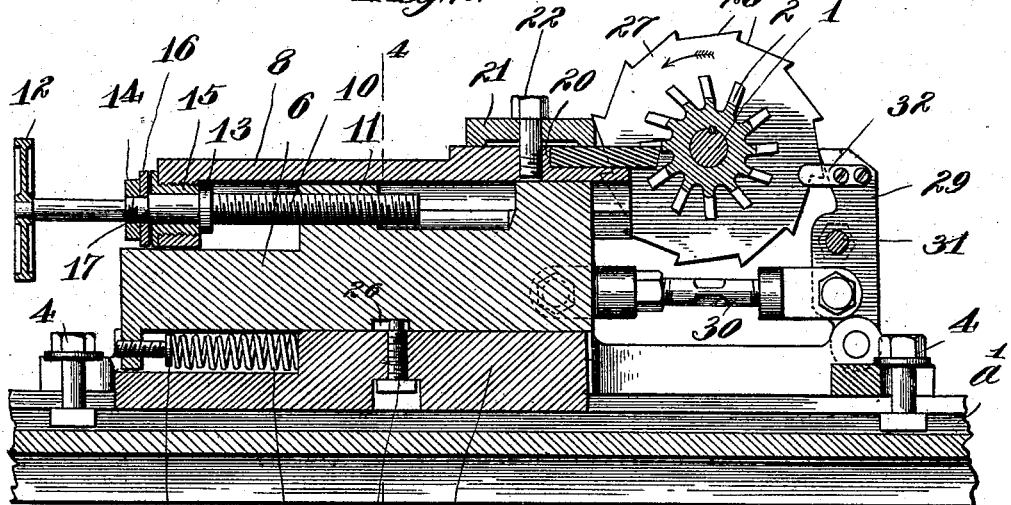
Witnesses:
Inventors.
Edward Grotz.
James W. Kennedy
By Atty No. 858,808. PATENTED JULY 2, 1907.
E. GROTZ & J. W. KENNEDY.
ATTACHMENT FOR MILLING MACHINES.
APPLICATION FILED AUG. 28, 1905.
2 SHEETS—SHEET 2.
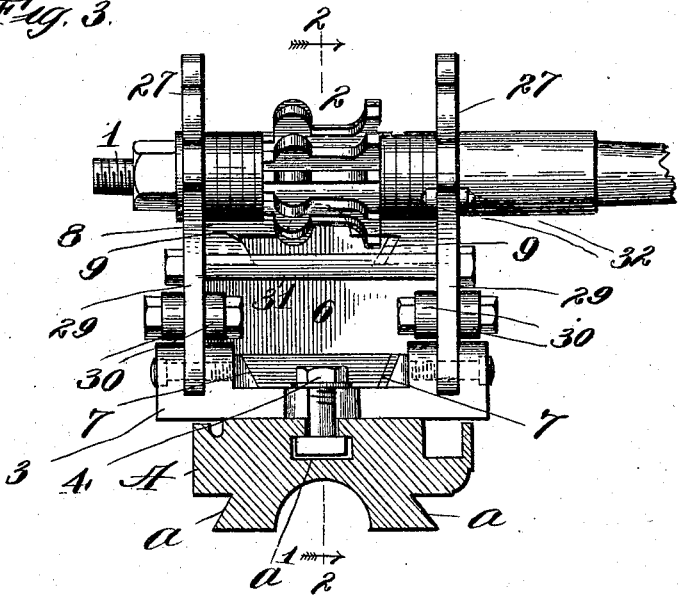
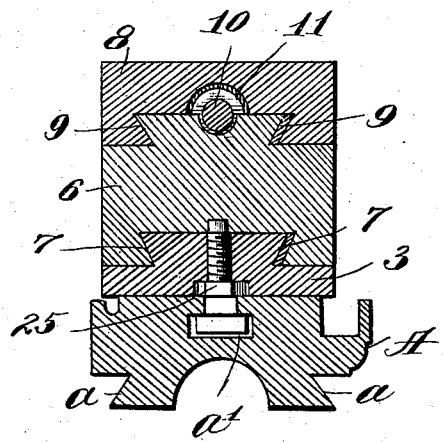
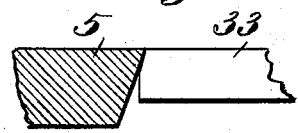
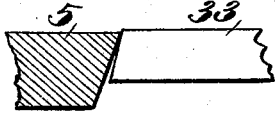
Witnesses:
Inventors:
Edward Grotz,
James W. Kennedy
By
Atty
THE NORRIS PETERS CO., WASHINGTON, D. C.

UNITED STATES PATENT OFFICE.

EDWARD GROTZ AND JAMES WALKER KENNEDY, OF CHICAGO, ILLINOIS, SAID GROTZ ASSIGNOR TO SAID KENNEDY.

ATTACHMENT FOR MILLING-MACHINES.

No. 858,808.          Specification of Letters Patent.          Patented July 2, 1907.

Application filed August 28, 1905. Serial No. 276,076.

*To all whom it may concern:*

Be it known that we, EDWARD GROTZ and JAMES WALKER KENNEDY, both citizens of the United States, and residents of Chicago, in the county of Cook and State of Illinois, have invented certain new and useful Attachments for Milling-Machines, of which the following is a specification.

This invention relates to machines or devices for relieving or "backing-off" milling and other similar cutters, particularly cutters of irregular shapes.

Among the objects of the invention are, first, to reduce the cost and expense of relieving or "backing-off" cutters of the kind specified, second, to provide means for relieving or "backing-off" cutters so that the teeth thereof will be relieved or backed off accurately, thereby providing a cutter, the teeth of which are all of the same length and, in use, will be subjected to uniform duty, and, third, to provide a cutter, the teeth of which will be of the same shape from their front or cutting edges to their rear edges.

A tool of our invention consists of the various features, combinations of features and details of construction hereinafter described and claimed.

In the accompanying drawings, in which our invention is fully illustrated, Figure 1 is a top plan view of a device of our invention, shown as embodied in an attachment for a milling machine, the cutter to be relieved or backed off being shown in section. Fig. 2 is a sectional elevation on the line 2—2 of Fig. 3. Fig. 3 is a right hand end view of a device of our invention, showing the bed of the milling machine in section. Fig. 4 is a transverse sectional view on the line 4—4, Fig. 2. Fig. 5 is a side view of one flute or tooth of the cutter, showing, in shade, the part thereof to be cut away to give the desired relief or clearance; and Figs. 6 and 7 show the relation of the cutting tool to the flutes or teeth of the cutter to be backed off at the beginning and end of the operation.

A tool of our invention may be made as a separate machine, complete in itself, but it will generally be made as an attachment to a milling machine and it is this form which is shown in the drawings, in which A designates the bed of a milling machine, provided with dovetail bearings *a* designed to engage suitable guides or ways on the knee or bracket, not shown, of the milling machine and with a T-slot *a'* in its upper surface. 1 is an arbor designed and adapted to be secured in the spindle, not shown, of the milling machine. The bed A and arbor 1 are shown in operative relation.

The cutter to be "backed-off," shown at 2, is secured against rotation to the arbor 1, after having been first finished to size, contoured and fluted.

The operative parts of said attachment are mounted on a base plate 3 designed and adapted to be removably secured to the bed A of the milling machine by clamping screws 4, in a familiar manner.

The "backing-off" or cutting tool, shown at 5, is mounted at one side of the arbor 1, so as to be movable towards and from the same, on a slide 6, suitable guides 7, on which engage corresponding guide ways on the base plate 3. Preferably, also, the cutting tool 5 is mounted on said slide 6 so that it may be fed toward and from the arbor 1 and the work carried thereon, the cutter 2, independently of the slide 6. As shown, said cutting tool 5 is mounted directly in a slide 8, suitable guides 9, on which engage corresponding guides or ways formed on the upper surface of the slide 6 and which is adapted to be fed manually by means of a hand operated feed screw 10, revolubly secured against longitudinal movement in the slide 8 and threaded into a rigid boss or projection 11 on the slide 6. Said feed screw is adapted to be turned by means of a hand wheel 12 secured to the outer end thereof. As shown, said feed screw 10 is secured against longitudinal movement relatively to the slide 8 by a collar 13 thereon and a nut 14 which embrace opposite sides of a rigid part of said slide 8, as shown, a bushing 15 threaded into a rigid projection on said slide. The bushing 15 is larger than the collar 13, thus making provision for conveniently assembling the parts. In the preferable construction shown, also, a disk 16 is inserted between the nut 14 and the bushing 15, being clamped between said nut and a shoulder 17 on said feed screw without, however, binding on the end of said bushing. Formed on the perimeter of the disk 16 is a scale 18, preferably graduated to thousandths of an inch, and formed on the bushing 15 is an index or zero mark 19. Said scale affords convenient means for indicating the depth of the cut, as follows:—By means of the feed screw 10, the slide 8 is fed in until the cutting tool 5 begins its cut, the nut 14 is then loosened, the disk 16 turned until the zero mark of the scale thereon registers with the index 19 on the bushing 15 and the nut 14 again tightened. As the cutting tool 5 is fed forward, it is thus obvious that the exact amount of the feed will be shown on said disk, all in a familiar manner.

The cutting tool 5 may be secured to the slide 8 in any desired manner to insure that it will be rigidly supported. As shown, the rear side of said cutting tool abuts against a shoulder 20 formed on said slide and is held down by means of a clamp 21, which is adapted to be drawn into strong engagement therewith by means of cap screws 22, in an obvious manner.

The cutting tool 5, is maintained normally yieldingly retracted from the work, as shown, by a spring 23, inserted between rigid portions of the bed plate 3, and the slide 6. To provide for adjusting the tension of the spring 23, one end thereof bears against a stud 24, threaded into the end of the slide so as to be adjustable in the direction of the length of said spring. Relative movement of the base plate 3 and slide 6 under the influence of the spring 23, is limited by means of a suitable stop, as shown, a stud 25, in said base plate, which projects into a slot 26 in said slide, an end of which forms a stop co-acting with said stud. Said stop is merely for the purpose of preventing displacement of said slide and base plate when the tool is not in use. When in use, said stud 25 is at all times held away from the end of said slot 26.

As the arbor 1 rotates, the cutting tool 5 is intermittently fed towards the work, released and then retracted by the spring 23, the number of actuations corresponding to the number of teeth in the cutter to be "backed off." In the preferable construction shown, this is effected as follows:—Secured to the arbor 1 are one or more cams 27, preferably two, one at each end of the work, the cutter 2 to be "backed-off," and in close proximity thereto. When a single cam is used, it is secured to the arbor outside of the work. Formed on said cams 27, are series of similar inclined or cam surfaces 28, there being a cam surface 28 on each cam for each tooth of the cutter 2 and separating said teeth are usually, though not always necessarily, abrupt shoulders. The cam surfaces 28 of the cams 27 are engaged by the distal ends of arms 29 pivoted to the base-plate 3 at the rear side of the arbor 1, that is, on the opposite side thereof from the cutting tool 5, and which are rigidly connected to the slide 6 by rods 30, the opposite ends of which are pivotally connected to said arms and to said slide. To provide for adjusting the relative positions of co-acting parts of the device located on opposite sides of the work or arbor, the rods 30 comprise sections provided with right and left hand screw threads whereby the lengths of said rods may be adjusted.

As shown, the arms 29 are rigidly connected together by a tie rod 31 and one thereof is provided with guides 32, which embrace opposite sides of the cam 27 engaged thereby, thus insuring engagement of said arms with said cams, in the designed manner.

With the relation described, the arbor 1, cutter 2 and cams 27 should rotate in the direction indicated by the arrow, see Fig. 2, that is, in the reverse direction to that in which a milling machine spindle usually rotates.

With the described construction, it is obvious that, as the arbor 1 rotates, the cams 27 acting through the arms 29 and rods 30, will operate to feed the slide 6 and thus the cutting tool 5 towards the work, the cutter 2, against the force of the spring 23 and, also, that as often as said arms run off from one set of cam surfaces 28, said spring 23 will retract said slide 6 and the cutting tool 5 and will bring said arms 29 into engagement with the next set of cam surfaces 28.

As previously stated, there is a cam surface 28 on each cam 27 for each tooth of the cutter 2 and the relation is such that the arms 29 will run off from said cam surfaces 28 just after the cutting tool 5 has finished its cut on a tooth, and will be retracted by the spring 23 and again started forward before said cutter reaches the next successive tooth of said cutter 2. With this construction and relation it is obvious that said teeth will be cut away on an angle leaving the cutting edges thereof higher than the rear edges thus providing the clearance desired. This operation is well shown in Figs. 5, 6 and 7 of the drawings, in which 33 designates a tooth of the cutter 2. In Fig. 5, the shaded portion b indicates the portion of the tooth which is to be cut away to provide the desired clearance. The device, having been adjusted to the machine and the work, the cutter 2 to be "backed-off," and the cams 27 having been placed on the arbor 1 in proper relation, as described, the machine is started, causing the arbor to rotate in the direction indicated. The cutting tool is then fed forward by hand until it begins to cut at the heels or rear edges of the teeth 33, as shown in Fig. 6, and is then gradually fed further forward until said cutting tool 5 has cut the teeth away to a desired sharpness at their front edges, as shown in Fig. 7. This can either be determined by the eye or by the scale on the disk 16 by setting said disk to zero as soon as the cutting tool begins to cut and feeding it in a distance corresponding to a given number of graduations on the scale, it being a simple matter to figure out, in the case of a given cutter, how far it will be necessary to feed the tool in to bring the cutting edges of the teeth to a desired sharpness and to provide the clearance desired.

A tool of our invention possesses several very important advantages, among which may be enumerated the following:—

1st. The saving in time required for "backing-off" a cutter. To the best of our knowledge, prior to the invention of our improved device, cutters of irregular form were "backed-off" by hand, an operation requiring a high order of mechanical skill and a great deal of time for its successful performance. Practical tests have shown conclusively that in most cases a cutter can be "backed-off" by means of our device in from one fifteenth to one twentieth of the time it can be done by hand.

2nd. The teeth of cutters "backed-off" by means of our device are absolutely of the same length, so that, in use, they will all be subjected to the same duty, thereby providing better work and, also, increasing the life of the cutter.

3rd. In cutters "backed-off" by means of our device, the teeth are of exactly the same shape from their front or cutting edges to their rear edges, so that when it is desired to sharpen said cutter it is only necessary to grind off the faces of the teeth until they are again sharp, without annealing or changing said cutter in any manner. It is thus obvious that the life of said cutter will be greatly increased, as they can be ground repeatedly without changing the shape of the teeth or affecting the clearance, until, from grinding, the teeth become too weak to stand up to their work. Not until then will it be necessary to discard said cutter.

4th. A further very great advantage of our device is that in operation the arbor on which the work is supported is subjected to practically no strain, the force of the cutting tool on the work being exactly counterbalanced by the pressure of the arms 29 on the cams 27. All tendency of the arbor to spring and consequent irregularity in the lengths of the cutter teeth due to springing of the arbor is thus prevented.

We claim:

1. The combination of an arbor, means whereby said arbor may be connected to a driven member, a cam on said arbor, means for securing work to said arbor between the connecting means and the cam, a cutter and connection from the cam to the cutter for controlling the latter and supporting the work.

2. The combination of a revoluble member for supporting the work, a movable tool holder, means for advancing said tool holder comprising cams secured to rotate with said revoluble member, one at each side of the work and in close proximity thereto, and operative connections between said cams and said tool holder.

3. The combination of a revoluble member for supporting the work, a tool holder, means to maintain said tool holder normally retracted and means for advancing said tool holder comprising cams secured to rotate with said revoluble member, one at each side of the work, arms which engage said cams and links which connect said arms directly with said tool holder.

In testimony, that we claim the foregoing as our invention, we affix our signatures in presence of two subscribing witnesses, this 26th day of August, A. D. 1905.

EDWD. GROTZ.
JAMES WALKER KENNEDY.

Witnesses:
M. V. McGRATH,
E. M. KLATCHER.